United States Patent [19]
Parry et al.

[11] Patent Number: 6,047,277
[45] Date of Patent: Apr. 4, 2000

[54] SELF-ORGANIZING NEURAL NETWORK FOR PLAIN TEXT CATEGORIZATION

[76] Inventors: Michael H. Parry, 115 Krameria St., Denver, Colo. 80220-5928; Richard K. Aspnes, 5342 E. Caley Ave., Littleton, Colo. 80121

[21] Appl. No.: 08/879,211

[22] Filed: Jun. 19, 1997

[51] Int. Cl.$^7$ .................................................. G06F 15/18
[52] U.S. Cl. .......................... 706/20; 706/14; 706/15; 706/16; 706/25
[58] Field of Search ................................ 706/15, 16, 20, 706/25, 26, 27, 14; 704/6, 7, 9, 10

[56] References Cited

U.S. PATENT DOCUMENTS

| | | | |
|---|---|---|---|
| 5,317,507 | 5/1994 | Gallant | 707/532 |
| 5,729,662 | 3/1998 | Rozmus | 706/20 |
| 5,787,234 | 7/1998 | Molloy | 706/46 |
| 5,794,178 | 8/1998 | Caid et al. | 704/9 |
| 5,835,087 | 11/1998 | Herz et al. | 345/327 |

OTHER PUBLICATIONS

Boughanem et al. "A neural network model for documentary base self–organising and querying," Fifth International Conference on Computing and Information, pp. 512–518, Mar. 1993.

Kohonen "Exploration of very large databases by self–organizing maps," International Conference on Neural Networks, vol. 1, pp. PL1–PL6, Jun. 1997.

Honkela et al. "Exploration of full–text databases with self–organizing maps," IEEE International Conference on Neural Networks, vol. 1, pp. 56–61, Jun. 1996.

Kimoto et al. "A dynamic thesaurus and its application to associated information retrieval," International Joint Conference on Neural Networks, vol. 1, pp. 19–29, Jul. 1991.

Merkl "Content–based software classification by self–organization," IEEE International Conference on Neural Networks, vol. 2, pp. 1086–1091, Dec. 1995.

Scholtes "Unsupervised learning and the information retrieval problem," IEEE International Joint Conference on Neural Networks, vol. 1, pp. 95–100, Nov. 1991.

Farkas "Generating document clusters using thesauri and neural networks," Canadian Conference on Electrical and Computer Engineering, vol. 2, pp. 710–713, Sep. 1994.

Merkl et al. "Analysis of legal thesauri based on self–organising feature maps," Fourth International Conference on Artificial Neural Networks, 1995, pp. 29–34.

*Primary Examiner*—Eric W. Stamber
*Assistant Examiner*—Jason W. Rhodes
*Attorney, Agent, or Firm*—Holland & Hart

[57] ABSTRACT

A method and system for natural language processing including using a trained neural network having a plurality of baseline nodes. A connection weight between any selected pair of baseline nodes is described by text strings within the selected pair of nodes. A plurality of text messages are received from a preselected source. For each received message, a non-baseline node associated with a selected one of the baseline nodes is created. A connection weight between any non-baseline node and the associated baseline node is described by the text string within the baseline node and the received text message.

25 Claims, 9 Drawing Sheets

SELF-ORGANIZING NEURAL NETWORK FOR PLAIN TEXT CATEGORIZATION

BACKGROUND OF THE INVENTION

1. Field of the Invention

The present invention relates, in general, to natural language processing, and, more particularly, to systems and methods for filtering and categorizing plain text messages to identify unique or atypical messages.

2. Relevant Background

Today large volumes of data are communicated between individuals and organizations electronically. Often these electronic messages are transferred automatically in newsfeeds or the like. Some automatic processing and reporting domains generate several thousands of reports each day, particularly in some government, news, or financial applications. These electronic messages represent thousands of reports that are transmitted and received on a daily basis.

To effectively use this large volume of information, it is necessary to identify trends, organize, correlate and fuse parametric, attribute, and free formatted data. These processes allow a user to induce knowledge from the raw factual information contained in the plain text messages. Automated tools to help analyze the message streams are seldom adequate to induce information from the data stream and the effectiveness of the available tools depends heavily on the level of experience and training of the system users.

A typical message storage system receives messages over a network or communications line and archives the messages to long term storage. A retrieval and dissemination system matches messages against user query profiles, and a user interface provides message display, annotation, and retrospective search capabilities. Some applications support counting and graphing capabilities such as histograms and bar charts that aide the skilled user in inducing information from the raw messages. Software indexing schemes or specialized hardware accelerators support search of the message database. Systems of this type typically receive thousands of messages and megabytes or gigabytes of data daily.

Trained personnel responsible for analyzing and assimilating the content of the incoming messages typically build complicated profiles to extract specific messages from the message stream. These profiles may be either highly specific, or very broad. Highly specific, elaborate, and exact profiles tend to generate high precision matches against the message stream for known topics of interest. In contrast, very broad profiles are designed to prevent missing important information by returning large amounts of information with lower probability of being relevant to the profile. High precision profiles generate short read queues but are prone to miss relevant messages that are near but not contained within the search volume specified by the profile. High recall profiles generate long read queues requiring users to read and determine the potential relevance of each message within the broad search volume specified by the profile.

One weakness of a template profile approach is that it requires extensive a-priori knowledge to initially construct the profiles. Anytime a-priori knowledge is required, the system becomes user-skill dependent. Also, significant resources are required read the large number of messages collected. Moreover, long term maintenance of the profiles requires expensive user resources because of the dynamic nature of the message streams. Maintaining high levels of query precision and recall efficiency requires continuous tuning of the query profile terms.

A desirable feature of a message processing system depicted is to identify new trends in the message stream. New trend identification depends upon a skilled user spontaneously noticing new patterns in the data. This difficult task is hampered by many factors such as large volumes of data, user fatigue, differing levels of training and experience, and personnel turnover. Effective trend identification requires that the user by made aware of the content and context of the data contained in the message stream.

Recognizing new situations is fundamentally a process that humans are much better at than computers. When it is not possible to fully automate the cognitive aspects required to process report data, then it is desirable to quickly focus the attention of an experienced human user on the most important information first and to reduce the workload of the user to the greatest extent possible without sacrificing performance. What is needed is a machine tool and system that assists a human user in the task of situation awareness, analysis, and problem recognition thereby reducing the workload on the system users and raising overall quality.

SUMMARY OF THE INVENTION

The present invention involves a method and system for natural language processing including using a trained neural network having a plurality of baseline nodes. A connection weight between any selected pair of baseline nodes is described by text strings within the selected pair of nodes. A plurality of text messages are received from a preselected source. For each received message, a non-baseline node associated with a selected one of the baseline nodes is created. A connection weight between any non-baseline node and the associated baseline node is described by the text string within the baseline node and the received text message.

In another aspect, the present invention involves a computer program product including a computer usable medium having computer readable code embodied therein for natural language processing. The computer program product includes computer readable program code devices configured to cause a computer to effect a trained neural network having a plurality of baseline nodes, wherein each baseline node has a weight described by a text string within the node. Also included are computer readable program code devices configured to cause a computer to effect receiving a plurality of text messages from a preselected source. Computer readable program code devices configured to cause a computer to effect for each received message, creating a non-baseline node having a weight described by the received text message are also included. Further included are computer readable program code devices configured to cause a computer to effect associating each non-baseline node with a selected one of the baseline nodes.

DETAILED DESCRIPTION OF THE PREFERRED EMBODIMENTS

1. Overview

Figure 1:
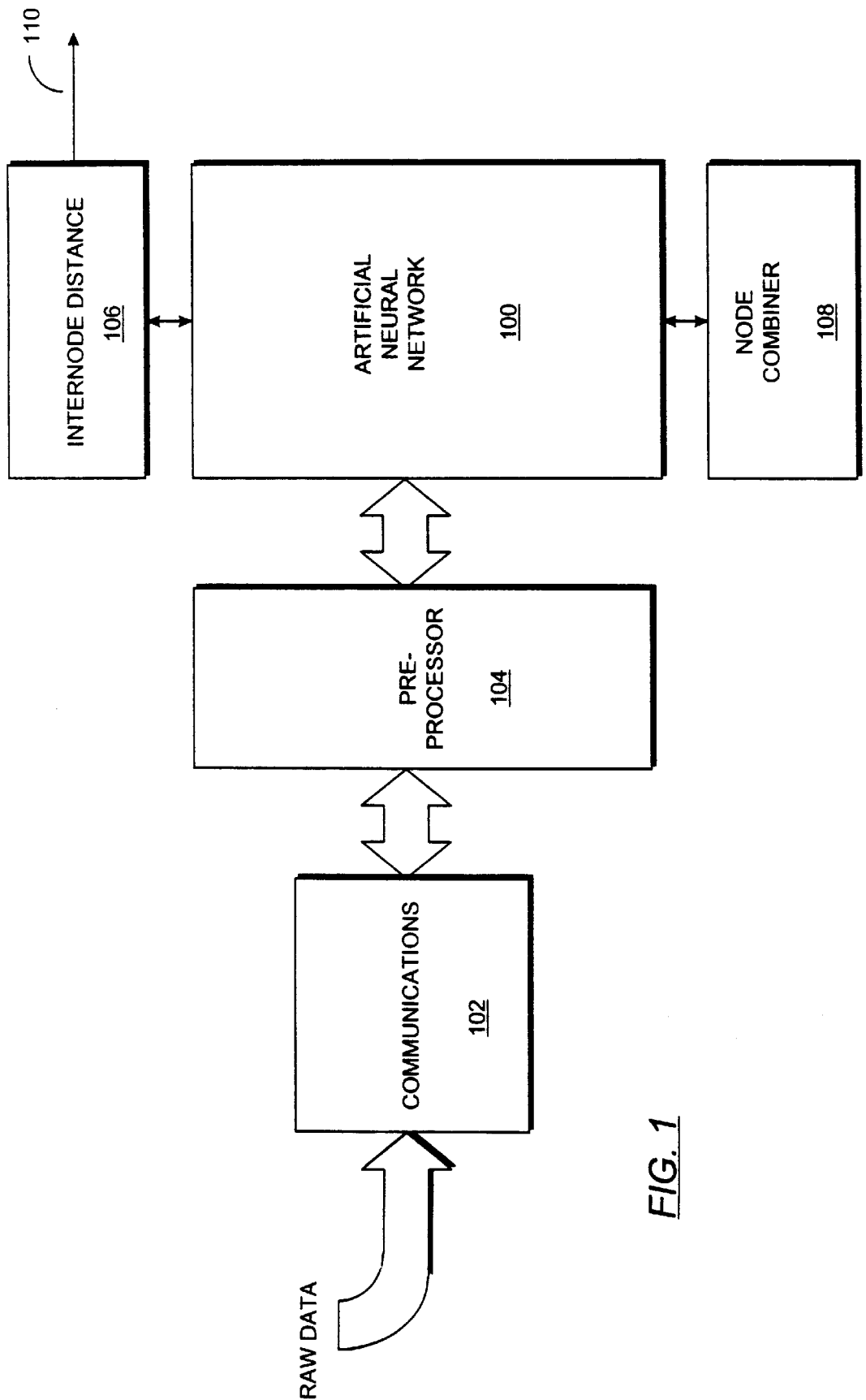
FIG. 1 shows in block diagram form major components of a text categorization system in accordance with the present invention.

The present invention involves a system including an artificial neural network (ANN) 100 (shown in FIG. 1) for text classification that may be implemented in hardware or software. In general, an ANN is a system comprising many simple processing elements or "nodes" operating in parallel. The function of an ANN is determined by network structures, connection strengths or weights, and the particular processing performed by the processing nodes. An ANN has a natural propensity towards storing experiential knowledge and making it available for use. Each of the nodes are connected to one or more other nodes by communication channels that typically carry numeric (as opposed to symbolic) data encode in any convenient manner.

An ANN system is particularly useful for classification problems to which hard and fast rules cannot be easily developed such as analysis of dynamic text message streams. Although typically ANN systems are used to map an input vector to a desired output function or output vector, the present invention uses ANN 100 primarily to classify text data among a plurality of nodes and analyzes the connection weight between nodes. The connection weight is an indication of similarity of text data to previously acquired text data.

In one aspect of the present invention, a user is alerted if a particular input text message is classified as atypical. Such an alert message could be generated by an output node of a neural network, although in the preferred embodiment this determination is made by statistical analysis of all of the connection weights in the ANN using conventional digital processing techniques implemented by inter-node distance circuit 106 shown in FIG. 1. As a result, the preferred implementation of the present invention does not does not require certain well-known ANN techniques such as back propagation of errors. However, ANN architectures using these techniques can easily be adapted to implement the present invention and are considered equivalents to the preferred implementations disclosed herein.

Typical ANN applications apply a text message as a stimulus, also called a "case", to input nodes of the ANN. In the typical application, the stimulus then trickles through the ANN causing certain ones of the nodes to activate or fire according to their inputs. Activation of output nodes then provides an output signal. In contrast, the present invention is primarily concerned with the relative distance of the nodes from each other and is not operated in a manner that applies a case to input nodes to generate an output signal. In a sense, ANN 100 of the present invention is never "operated" in the traditional sense. Instead, a baseline network is created comprising baseline nodes. The baseline network is then modified by the creation or addition of non-baseline nodes in response to new text data. The differences between the non-baseline nodes and the baseline network are evaluated by inter-node distance device 106 and reported to a user via an output 110. Finally, the non-baseline nodes are periodically combined with or rolled into the baseline nodes using node combiner device 108 to create baseline nodes of a new network. In this manner, the baseline nodes represent content of prior text messages (i.e., history) while the non-baseline nodes represent new data that are being compared to the prior text messages.

As shown in FIG. 1, the system in accordance with the present invention preferably includes communication device 102 for receiving text messages from a raw data stream. The raw data stream may be a newsfeed or news wire carrying digitized text information. Alternatively, the raw data source may be an Internet resource such as e-mail, a list server, or Usenet news group, or the like. Non-digitized text sources such as facsimile transmissions or optically scanned paper texts may also be used by providing some means for converting the text messages to a digitized text message. In a particular example, the text messages used herein are digitized using standard ASCII or Unicode coding techniques, but any available coding technique is equivalent for purposes of the present invention. The raw text data may be in any language and may include any alphanumeric characters that can be coded by the chosen coding standard.

Communications device 102 may operate in response to user commands or may operate automatically to connect to various selected external sources of text messages and couple those messages to the message classification system in accordance with the present invention. It is contemplated that a user will identify a group of text message sources to communications device 102 and that communications device 102 will periodically or continuously attach to the sources to extract text data.

Preprocessor 104 is an optional but useful component that serves to ease computer resources required to operate the present invention without fundamentally changing the content of the text messages from communications device 102. For example, preprocessor 104 can be used to remove duplicated reports from the various sources and split very large messages into multiple paragraph or sentence sized units. Other sized units may also be used including single words or character strings, however, it is useful if the message size is sufficiently large so that messages reflect context rather than purely consent. Additional preprocessing may be used to remove duplicate letters, punctuation, stop words (i.e., "the", "for", "one", "are", "and", and the like) and convert uppercase characters to lowercase. Preprocessor 104 may also be used group into temporal units or "reporting periods". Reporting periods may be of any convenient duration (i.e., single day, multiple day, multiple week, and the like). Multiple reporting periods may also be used.

2. ANN Architecture

Figure 2:
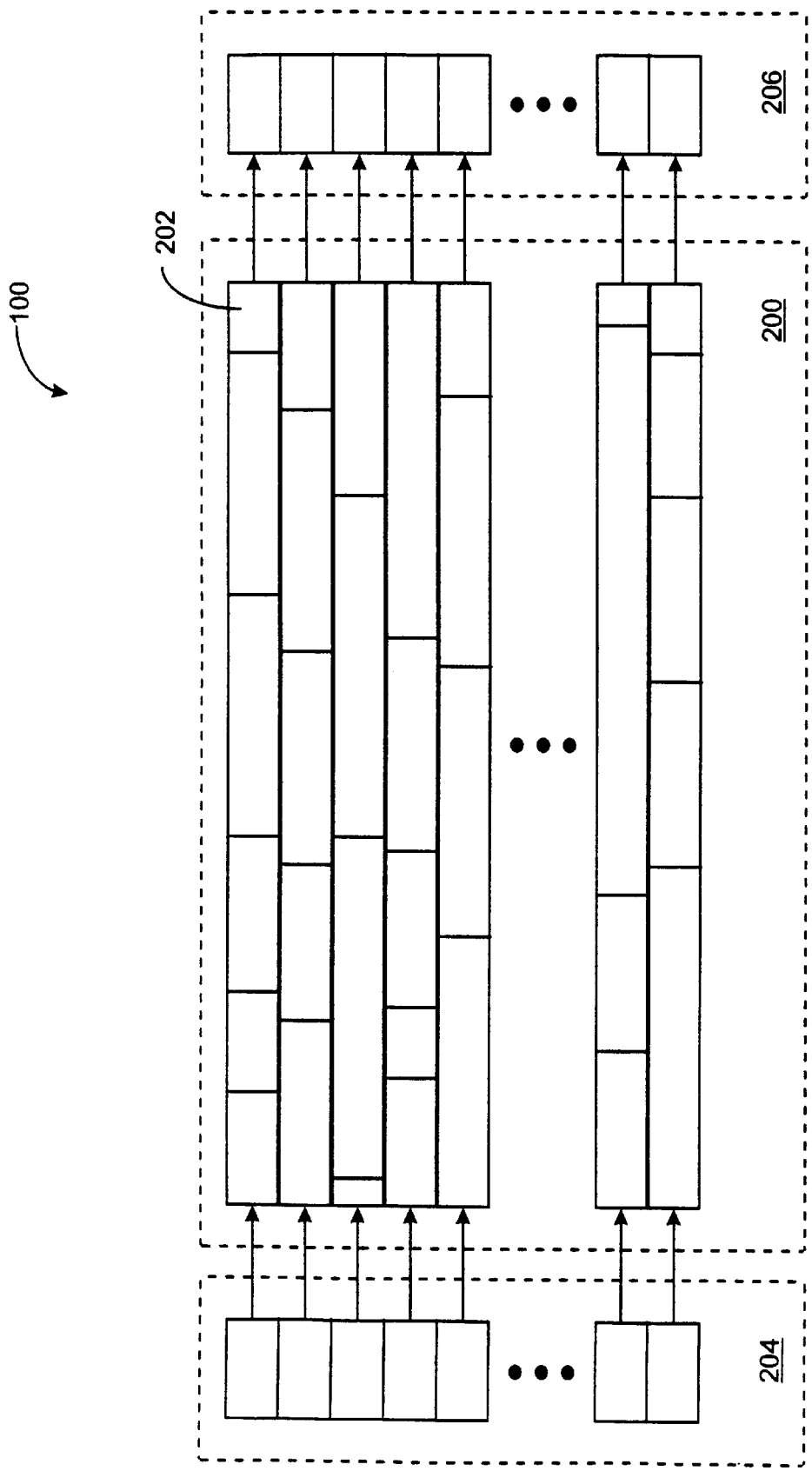
FIG. 2 illustrates in block diagram form an exemplary implementation in accordance with the present invention.

As set out hereinbefore, typical ANN architectures are designed to process numeric data stored in a node. In contrast, the present invention employs nodes 202, shown in FIG. 2, that store text data, and more generically can store symbolic data. As illustrated in FIG. 2, ANN 100 is implemented in a particular example in a memory device 200 where each node comprises a memory space 202 illustrated as a row of boxes in memory 200. Memory 200 is, for example, provided in a randomly accessed mass storage device such as a magnetic, optical, or magneto-optic disk device, although other storage devices, including solid state storage devices, may be used. Nodes 202 need not occupy contiguous memory space in memory device 200.

Each node 202 contains a plurality of text string tokens suggested by the boxed divisions within each node 202 in FIG. 2. The tokens stored within each node 202 may be words, word roots, word groups, phrases, sentences, or the like depending on the needs of a particular application. Delimiters are used between each of the word tokens within a node 202. In a particular example, nodes 202 have a fixed size (i.e., a fixed number of bytes of storage is reserved for each node 202). Some nodes 202 may be full, while others may contain less text.

Index or mapping file 204 includes a plurality of entries that map a particular node number to a particular memory space within memory 200 corresponding to a specific node 202. Index file 204 may be implemented in main memory of a computer for fast access to the contents of nodes 202 in which case index file 204 would resemble a conventional memory map in a virtual memory addressing system. Other indexing schemes are known and can be employed as equivalent substitutes to the specific embodiment described herein.

Each node 202 points to a location in an attachment index 206. Attachment index 206 serves to indicate a node to which a particular node 202 is "attached" or associated with. As described in greater detail hereinafter, a node 202 may be attached or associated with another node 202 based upon similarity between contents of the two nodes 202. Inter-node distance component 106 computes a metric score to determine similarity between nodes, and a node identification for a node having the highest score is recorded in attachment file 206. Some nodes may not be attached to any other nodes, in which case the corresponding location in attachment file 206 would be empty.

ANN 100 may include any number of nodes 202 within the physical memory and storage constraints of a given computer system. In experimental systems, ANN 100 has been implemented with one hundred to four hundred nodes 202, although more or less nodes could be used in a particular application. The size of each node 202 is chosen based on the desired message size provided by preprocessor 104 to ANN 100. Also, if Unicode encoding is used, greater node size will be required for any given text size than if, for example, ASCII encoding were used. These alternatives are a matter of design choice that are to be made to meet the needs of a particular application.

3. Node Similarity Measurement

Figure 3:
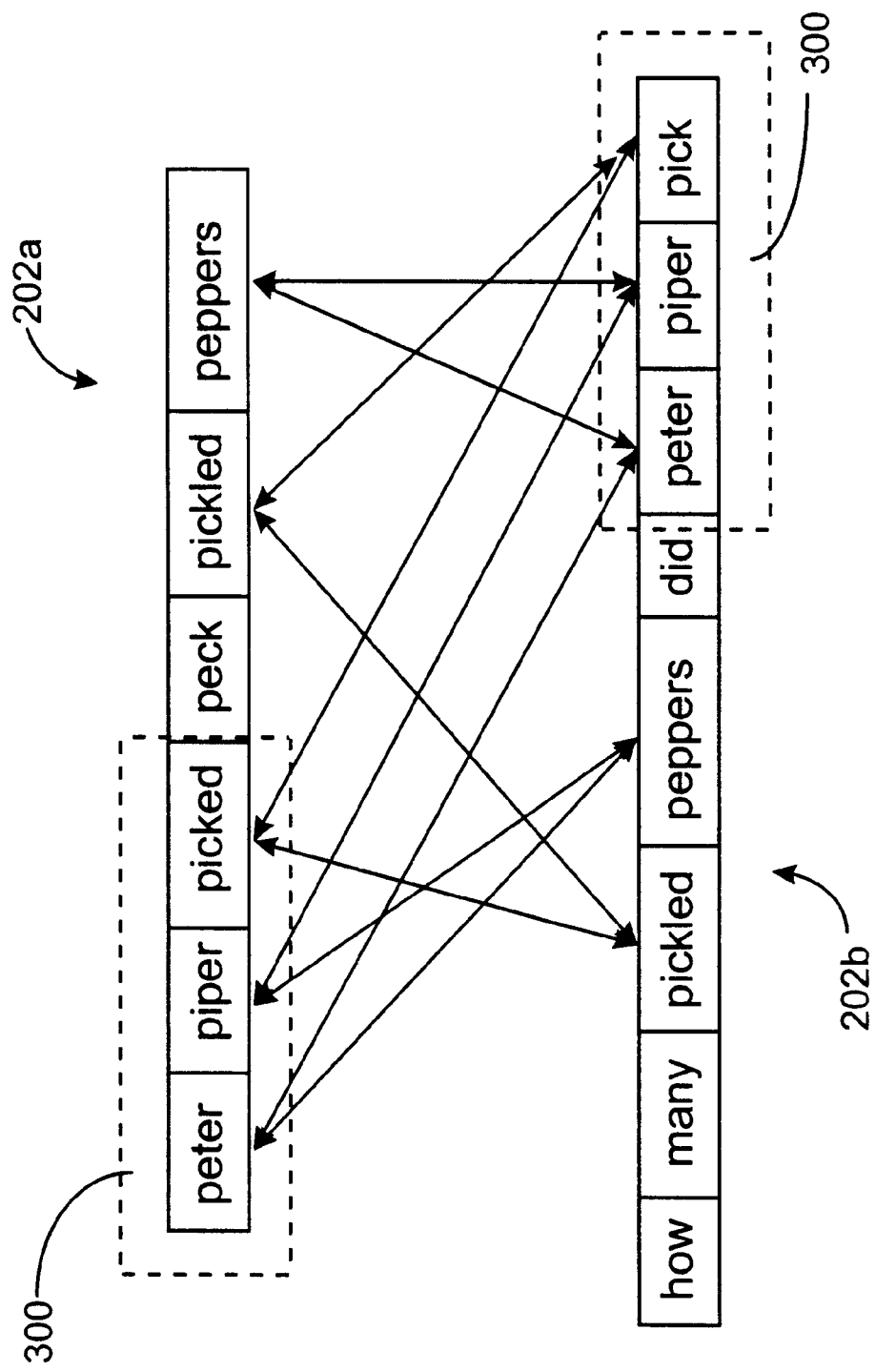
FIG. 3 illustrates operation of a scoring algorithm in accordance with a preferred embodiment.

As shown in FIG. 3, the present invention represents queries and documents as sets of terms or "tokens" within nodes 202 of ANN 100. Global similarities between these queries and documents are computed by inter-node distance component 106 (shown in FIG. 1) based on the presence of these terms. A vector-space model used in accordance with the present invention assumes that an available term set represents documents as term vectors of the form $$D_i = (a_i 1, a_i 2, \ldots, a_i t).$$

In a vector space, the similarity among vectors x and y can be measured by the product $$x \cdot y = |x| \, |y| \cos \alpha,$$

where $|x|$ is the length of x and $\alpha$ is the angle between the vectors. Modification and merging of queries or documents in accordance with the present invention (discussed in greater detail below) is achieved by modifying the coefficients $a_i$ including or removing terms from the term sets comprising the documents.

The preferred implementation of the present invention uses a Longest Common Sub-sequence (LCS) algorithm implemented in inter-node distance component 106 to measure vector similarity between nodes 202. The LCS algorithm is responsive to the sequential structure of word tokens contained in two texts in addition to the presence of word tokens as in the simple vector-space model. By responding to the sequential structure, the LCS algorithm is responsive not only to content of the nodes, but also context (i.e., the relationship of the tokens with respect to each other within a node 202). The LCS-based algorithm is used to evaluate vector similarity (i.e., relative position of nodes in a text hyperspace) and calculates a metric score using the equation:

$$\text{score} = \frac{len(LCS)}{[\min(len(s1), len(s2)) + \sqrt{len(s1) - len(s2)}]} \quad (1)$$

where len(s1) is the length of text within a baseline node, len(s2) is the length of text within a non-baseline node, and len(LCS) is the length of the longest common sequence between s1 and s2.

FIG. 3 illustrates an example of the application of the LCS algorithm in accordance with the present invention. Node 202a contains the text tokens "peter", "piper", "picked", "peck", "pickled", and "pepper". Node 202b contains the text tokens "how", "many", "pickled", "peppers", "did", "peter", "piper", "pick". Stop words have been removed from the tokens in node 202a and 202b. The arrow in FIG. 3 indicate token matches according to the LCS algorithm. The LCS algorithm used tolerates missing and transposed characters and produces token matches for the following token pairs:

TABLE I

| | |
|---|---|
| peppers-peppers | pick-pickled |
| peter-peter | pickled-picked |
| peter-piper | pickled-pickled |
| pick-picked | piper-piper |

In the example of FIG. 3, the longest common subsequence is "peter piper pick(ed)" indicated by dashed boxes 300 and has a length of 3. Using the LCS-based scoring formula set out above, the score for the example in FIG. 1 is $$\text{score} = \frac{3}{6 + \sqrt{2}} = 0.404628$$

In this manner, the algorithm of equation (1) captures the notion of token sequences (i.e., context) and token presence (i.e., content). The metric scores range from 0.0 to 1.0 in the specific example, but equation 1 can be readily modified to generate any desire output range. Exact matches score 1.0 and the scores decline rapidly for token miss-matches and less rapidly for differences in the source string lengths. The LCS algorithm performs the task of measuring distances between nodes 202 in the text hyperspace defined by ANN 100.

4. Node Combination

Figure 4:
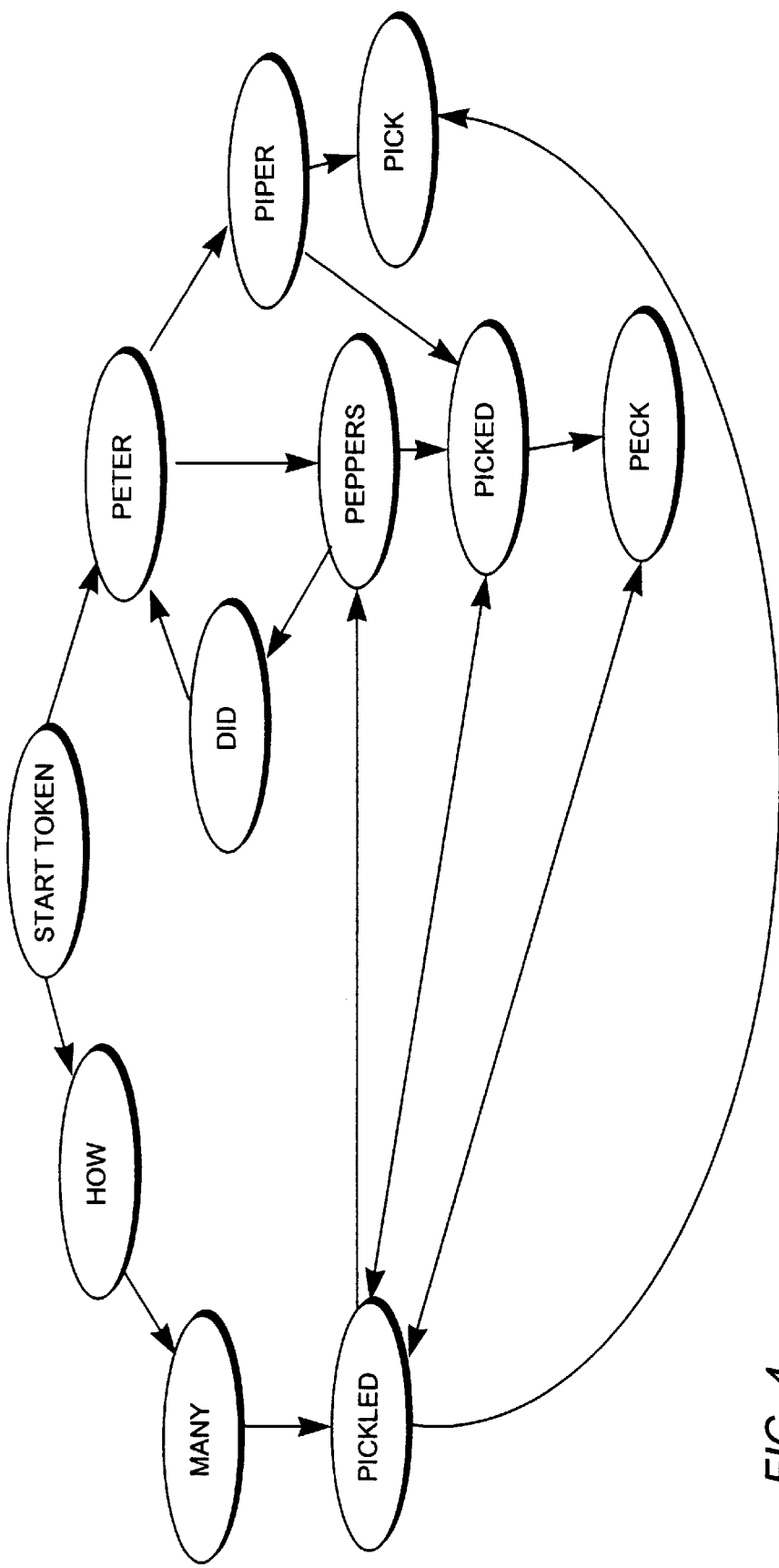
FIG. 4 illustrates operation of a genetic algorithm in accordance with the present invention.

To update and train ANN 100 requires a method of combining text documents so that connection "weights" in ANN 100 can be modified. In the preferred implementation, a genetic algorithm (GA) is used by node combiner 108 (shown in FIG. 1) to merge text documents into the tokens within a given node 202, as described in reference to FIG. 4. Essentially, the GA encodes token sequences from two "parent" texts (i.e., nodes 202a and 202b) into a graph shown in FIG. 4 where individual tokens are represented in ellipses. The GA generates new "child sequences" by randomly traversing the graph as suggested by arrow headed lines in FIG. 4 and extracting token sequences. The graph traversal and extraction process illustrated in FIG. 4 makes use of a topological sorting algorithm modified to work within cyclic graphs as discussed in *Introduction to Algorithms* by Cormen, T., Leiserson, C., Rivest, R., MIT Press, Cambridge Mass., 1992.

In the preferred embodiment, the LCS algorithm is used to repeatedly compare each of the extracted token sequences to the parent token sequences in nodes 202a and 202b. In a specific example, repeated application of Depth-First-Search and Topological Sorting techniques produces a series of extracted "child" token sequences. The GA replaces the parent token sequences with the best matching child token sequence as the merged representation. The merged token sequence is considerably nearer in the text hyperspace to each of the parent token sequences than the parent token sequences are to each other. The evaluation function is the average of the LCS-based metric score (described in reference to FIG. 3) between each of the parents and each of the extracted child sequences. The number of iterations is chosen to balance the likelihood of a suitable match against processing time required for each repetition.

For the example of FIG. 3, the metric score for the node pair 202a–202b is 0.404628 as calculated above. The best child sequence derived in a particular experimental implementation is the token sequence: "how" "many" "peter" "piper" "picked" "peck" "pickled" "pepper" "did" "pick". Applying equation (1), the metric score for node 202a compared to the child token sequence is 0.75, improved from 0.404628. Similarly, the metric score for node 202b compared to the child token sequence is 0.637334, improved from 0.404628. The merge score is the average of these two metric scores, or 0.693667 in the particular example.

In accordance with the preferred implementation of the present invention, the GA and LCS algorithms cooperate to effectively model the text message vectors making it possible to model the entire text hyperspace and to compare nominal baselines with off-nominal input data.

5. ANN Training and Operation

The training algorithm for a self-organizing neural network depends upon 1) a method to measure the distance between each node and the input case and 2) a method to modify the most responsive node so that it responds even more strongly to the input. The LCS metric and the GA text merging algorithms described above accomplish these tasks in the text domain. The connection "weights" that comprise the neural representation in the text domain are actually described text strings in accordance with the present invention.

Figure 5:
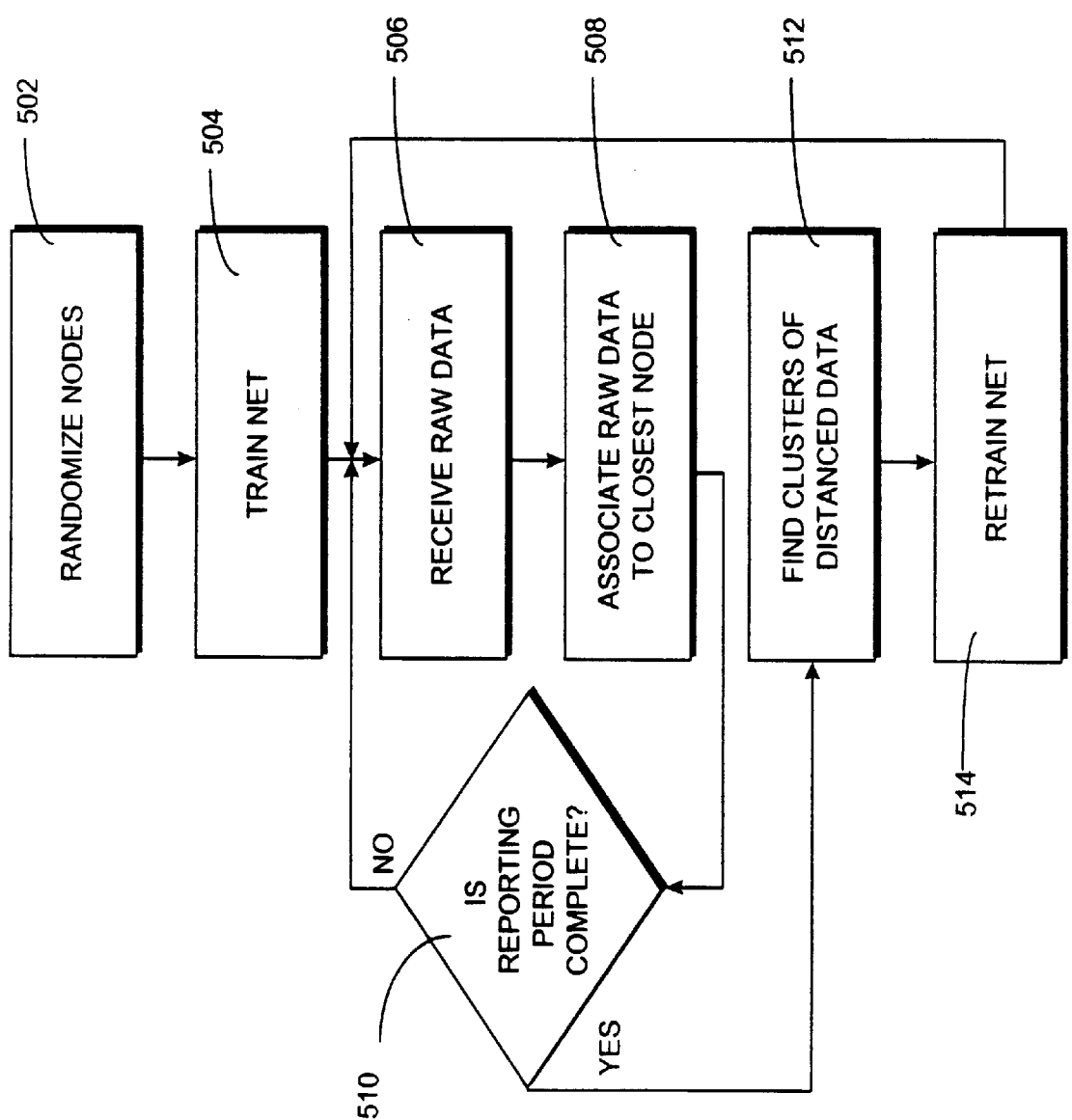
FIG. 5 shows a flow chart of steps involved in a method in accordance with the present invention.

FIG. 5 illustrates in flow chart form the operation of a text categorization system in accordance with the present invention. ANN 100 is initialized by placing nodes 202 (shown in FIG. 2) into a random state in step 502. Step 502 is conveniently accomplished by filling nodes 202 with sequences of tokens chosen randomly from a dictionary database or from a raw text database (not shown). In steps 504, ANN 100 is trained by repeatedly applying text messages and comparing each applied text message with each node 202 using the LCS-based equation (1) described hereinbefore. The applied text messages are extracted from the same data sources that are to be used in operation in a preferred embodiment, although other data sources may be used for training in some instances. Based on the score given by equation (1), the applied text is merged into a node 202 that has the greatest response to the applied text using the genetic algorithm described above. The training process is repeated iteratively with new cases until a desired level of convergence results that may take many thousand or tens of thousands of iterations in particular cases. A goal of the training process is to have sufficient individual nodes 202 responding to input data to adequately map the text hyperspace. If too few nodes respond, ANN 100 will not be able to discriminate between applied cases. If too many nodes respond, ANN 100 will become more sensitive to noise in the input data (i.e., classify similar texts in different categories based upon irrelevant information in the token sequences).

It has been found that the text domain neural networks in accordance with the present invention successfully models (i.e., self-organizes) the text hyperspace represented by the training data. The LCS metric and the genetic merge algorithms used in the preferred implementation demonstrate capability to manipulate and modify the ANN 100 in a manner consistent with self-organizing (e.g., Kohonen network style) behavior. After training step 504 is completed the ANN 100 is frozen and nodes 202 become "baseline nodes" against which subsequent sets of text messages (i.e., cases) received in step 506 can be compared.

Differences between the baseline nodes and the distribution of new data, called "non-baseline nodes" herein, are mapped to the baseline indicate new and unusual data that merits further study by the users. In step 508, a new case in the form of a non-baseline node is associated with a closes baseline node. The association step 508 may create a direct association with a non-baseline node or an indirect association. The differences between direct and indirect association are described in greater detail below. During any given reporting period, as determined in step 510, new data is repetitively received in step 506 and associated to other nodes 202 in step 508. In contrast to the training step 504, the associations made in step) 508 are not combined with or rolled into the baseline nodes during the reporting period. Instead, new non-baseline nodes are added to ANN 100 during the reporting period.

At the end of a reporting period as determined in step 510, step 512 is initiated to identify clusters (shown in FIG. 7 and FIG. 9) of non-baseline nodes that are directly or indirectly associated with a baseline node. The quantity of non-baseline nodes in any cluster indicates a frequency with which a particular class or family of text tokens appeared in the raw data stream, whereas the connection weight between the non-baseline nodes indicates similarity among the nodes in a cluster. The cluster analysis step 512 is a useful method of identifying atypical data in the raw data stream. When a sufficient number of non-baseline nodes are available in a cluster, the cluster analysis may also include analysis of how "tight" (i.e., how compact or cohesive) a cluster is. This analysis may include, for example, a determination of the "diameter" of the cluster in the text hyperspace.

Once cluster analysis is complete, the non-baseline nodes can be combined with the baseline nodes using either the genetic algorithm described above or simply be retraining ANN 100 using both the original training data and the new data in the non-baseline nodes to generate a new ANN 100. Step 514 serves to keep ANN 100 updated so that it is responsive to content changes in the dynamic raw data stream and gradually learns to stop responding to data that was atypical in prior reporting periods.

It is desirable to model the text hyperspace using non-a-priori methods to avoid biases inevitably introduced by a-priori techniques. One method to accomplish this goal is to model the text hyperspace using self-organizing (Kohonen style) neural network for ANN 100. Self-organizing ANNs model (learn) an input domain by devoting neural responses to regions of the hyperspace in proportion to the density of the training data. Although it is desirable to use self-organizing techniques, however, it should be understood that supervised learning or hybrid learning techniques may be used and may be desirable in some applications. For example, in one experimental implementation in accordance with the present invention, an Extensible Minimum-Spanning-Tree (MST) architecture network was used and the size was chosen a-priori to be 384 nodes. The algorithm assigned a document from the training data to each of the nodes and calculated the distance between each document pair. Then using Prims MST algorithm, document pairs were identified, merged, and inserted to form baseline nodes. Although this implementation is not preferred, acceptable results were achieved.

6. Choice of ANN Architecture

In the self-organized model adjacent neurons represent data that is also relatively adjacent in the hyperspace. The model is sometimes referred to as a smooth cognitive mapping of the hyperspace. The mapping is a suitable baseline representation model for comparing data. Examples of two self-organizing text neural network architectures that have been experimentally implemented are shown in FIG. 6 through FIG. 9. The axes in FIG. 6–FIG. 9 are provided for ease of illustration and it should be understood that the text hyperspace in accordance with the present invention may include any number of dimensions to meet the needs of a particular application. In FIG. 5 through FIG. 9, nodes 202 illustrated by solid circles represent baseline nodes while atypical non-baseline nodes are illustrated as solid triangles and typical baseline nodes are illustrated as solid squares. The first implementation, shown in FIG. 6 and FIG. 7 comprises a one-dimensional circular array of processing nodes 202. During training (i.e., step 504 shown in FIG. 5) ANN 100 passes through the baseline data partitioning the hyperspace into regions of attraction around each baseline node. When comparing new data (i.e., steps 506 and 508 shown in FIG. 5) to the baseline, the new documents are directly attached to the nearest, most responsive, baseline node.

Figure 7:
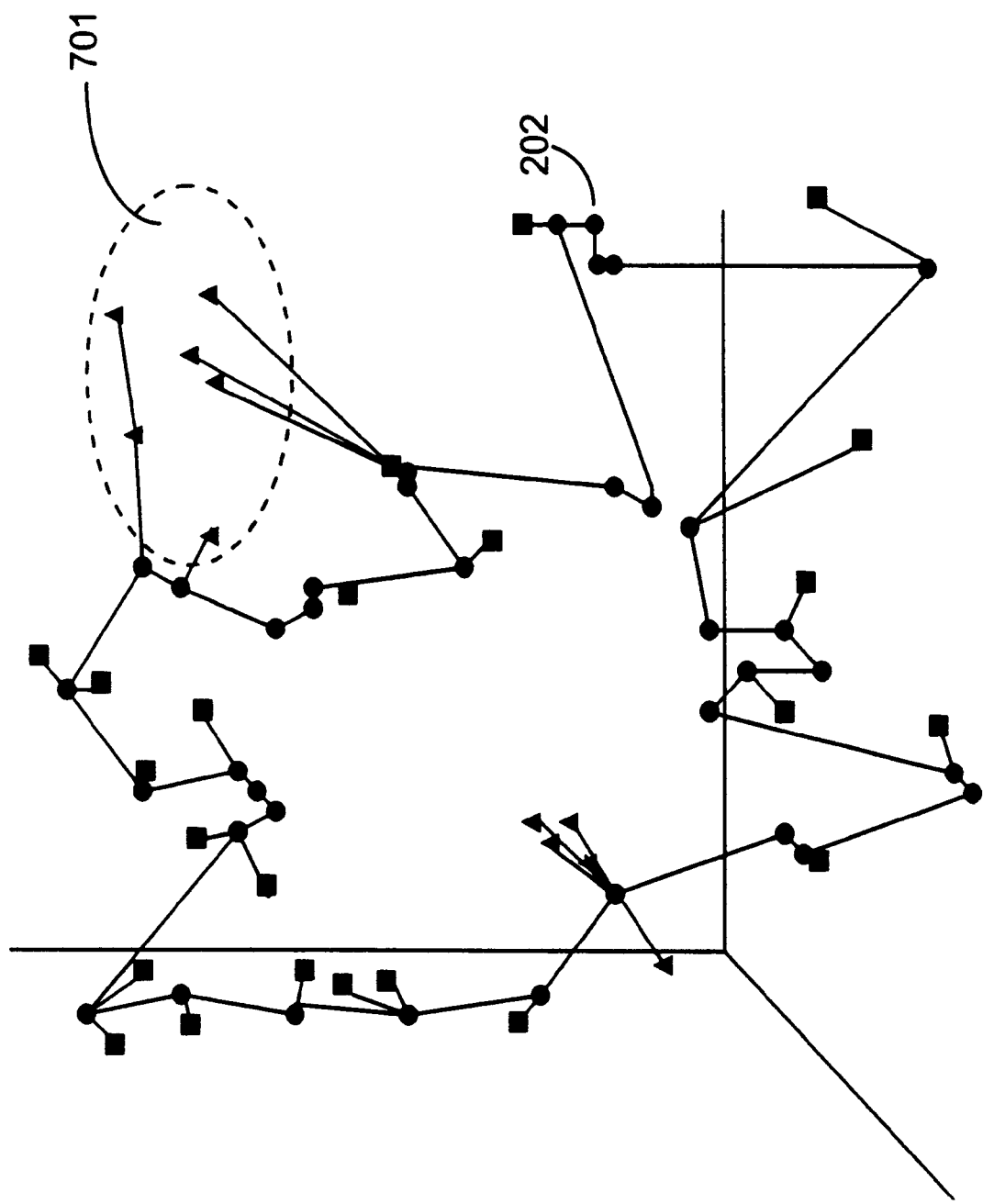
FIG. 7 illustrates the network of FIG. 6 with non-baseline nodes added.

Desirably, new data in non-baseline nodes will form clusters about a baseline node such as cluster 701 shown in FIG. 1. However, because of the high number of dimensions of the hyperspace a new text document is almost identically close to several baseline nodes. Documents forming a new data cluster subsequently span the regions of attraction of many baseline nodes and cluster 701 includes non-baseline nodes that are associated with multiple baseline nodes as shown in FIG. 7. This "fracturing" (i.e., associating non-baseline nodes in a cluster with a plurality of baseline nodes), which may be tolerable in some applications, is an artifact of the process of directly associating non-baseline nodes to baseline nodes. Fractured cluster 701 is more difficult to distinguish from background noise created by text documents that are placed in non-baseline nodes but represent typical text that is substantially characterized by the baseline nodes.

Figure 6:
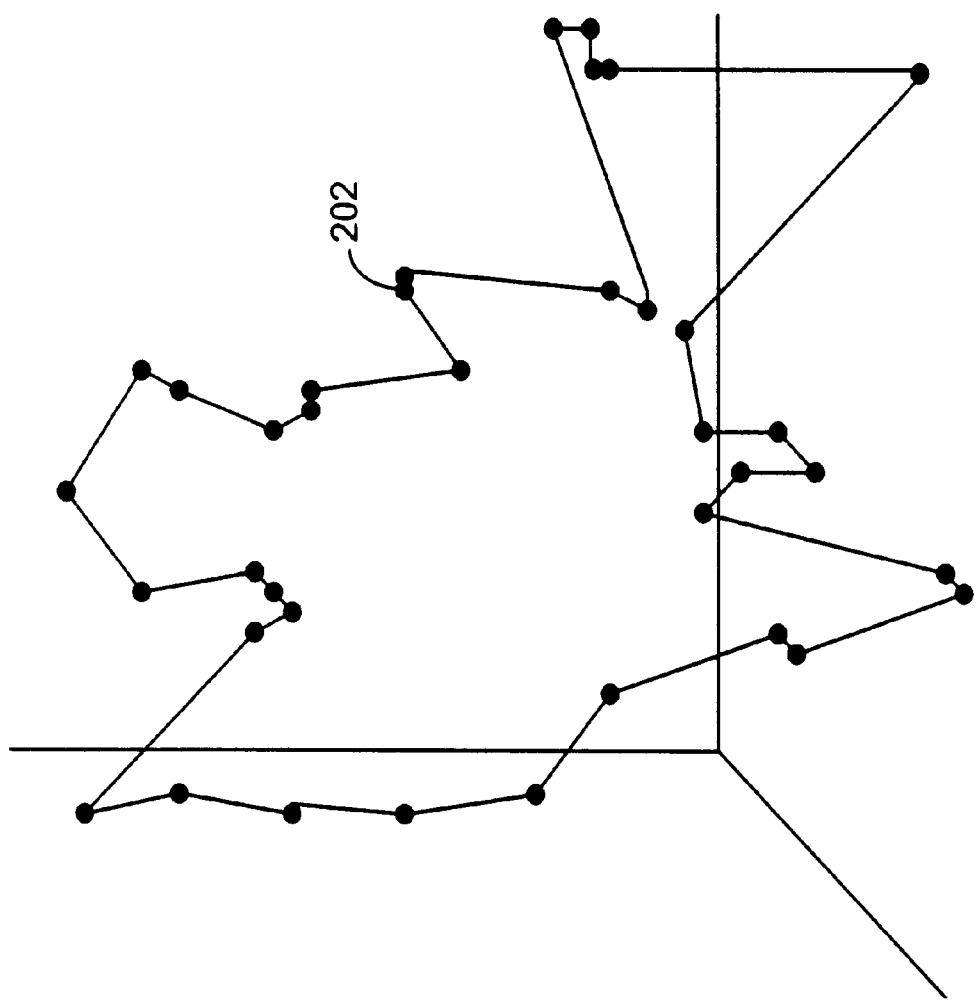
FIG. 6 shows a hyperspace map of baseline nodes in a first embodiment neural network in accordance with the present invention.
Figure 8:
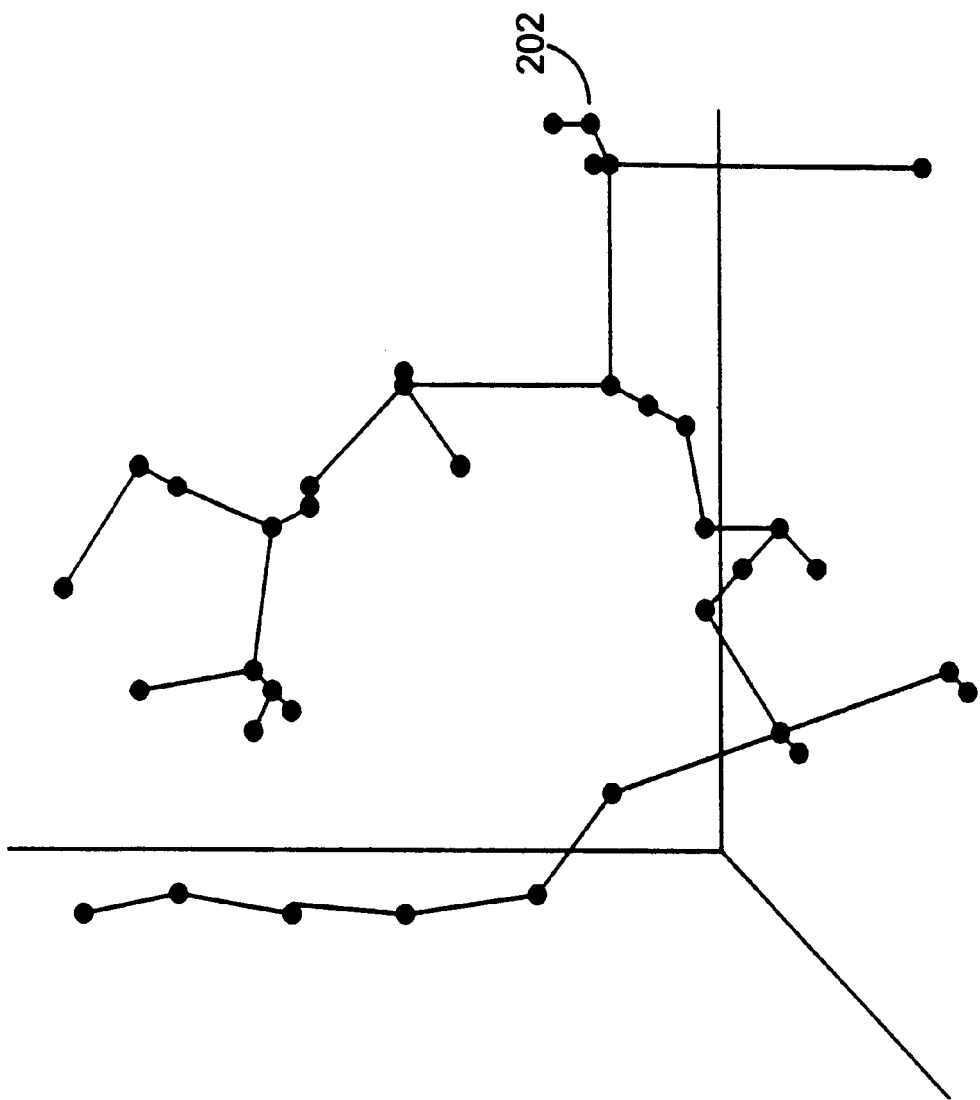
FIG. 8 shows a hyperspace map of baseline nodes in a second embodiment neural network in accordance with the present invention.
Figure 9:
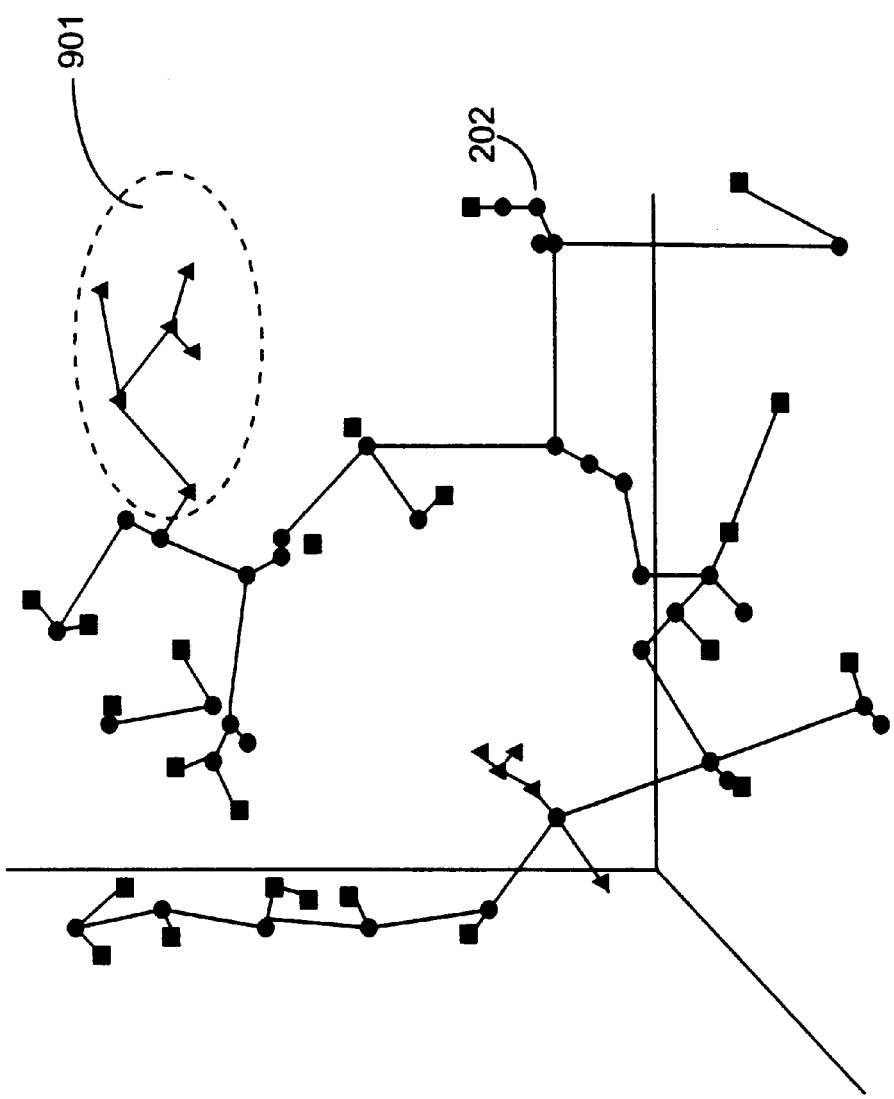
FIG. 9 shows the network of FIG. 8 with non-baseline nodes added.

A second architecture illustrated in FIG. 8 and FIG. 9 addresses the fracturing problem observed in the one-dimensional neural net shown in FIG. 6 and FIG. 7. This alternative uses an Extensible Minimum-Spanning-Tree (MST) architecture and grows a "tree" of connections to cover the hyperspace as shown in FIG. 8. The tree architecture is maintained when adding non-baseline nodes to ANN 100. Adding new data as an extension of a tree branch forces large clusters to be attached to the baseline at a single node as shown by cluster 901 in FIG. 9. This creates larger clusters that are more likely to be distinguishable from background noise, and trigger further analysis. Note the same points fractured across three baseline nodes in the one-dimensional case attach to a single baseline node in the extensible MST architecture.

It is contemplated that by using the extensible network technique (i.e., adding non-baseline nodes as shown in FIG. 9) on the one-dimensional self-organizing network shown in FIG. 6 should produce similar clustering results to the MST architecture. The advantage of the MST network is that it has a well-defined structure that requires less computing power to construct than the training required by the one-dimensional network. The disadvantage of the MST network is that the size of the network must be chosen a-priori and it is difficult to consistently match the network size to the number of documents that must be categorized. The advantage of the self-organizing network is that it can be of smaller more consistent sizes. The disadvantage of the self-organizing network is that more computing effort is required to train the network to fully cover the text hyperspace. Specific application areas must trade off speed, coverage, and architecture issues.

7. Conclusion

Self-organizing methods are capable of accepting text data from a series of reporting periods, building a baseline to model the data hyperspace, and distinguishing the most unusual data in subsequent reporting periods from data corresponding closely to the previous baseline. These techniques are valuable tools to process data when a-priori techniques are too expensive or insufficient to track a dynamic environment. The algorithms prioritize and focus user attention and resources on the newest, most unusual, and interesting data in the data stream. The results demonstrate the algorithms successfully find early indications of events that later become significant to the data analysts. This capability improves situation awareness and creates longer lead times to respond to the events reported in the data stream.

Although the present invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A method for natural language processing comprising the steps of:

training a neural network comprising a plurality of baseline nodes, wherein a connection weight between any selected pair of baseline nodes is determined from text strings within the selected pair of nodes;

receiving a plurality of text messages from a preselected source; for each received message, creating a non-baseline node associated with a selected one of the baseline nodes wherein a connection weight between any non-baseline node and the associated baseline node is determined from the text string within the baseline node and the received text message; and identifying atypical received messages based upon the connection weight between any non-baseline node and the associated baseline node.

2. The method of claim 1 wherein the step of creating a non-baseline node further comprises:

applying each received text message to the neural network;

for each non-baseline node, calculating a distance from each baseline node in the neural network to determine the connection weights; and based upon the calculating step, associating the non-baseline node with a baseline node having the greatest connection weight.

3. The method of claim 1 wherein the step of creating a non-baseline node further comprises:

applying each received text message to the neural network;

for each non-baseline node, calculating a distance from each baseline node and each prior non-baseline node in the neural network to determine the connection weights; and based upon the calculating step, associating the non-baseline node directly with a baseline node having the greatest connection weight unless there exists a prior non-baseline node with greater connection weight than the greatest baseline node in which case the non-baseline node is indirectly associated with the baseline node associated with the prior non-baseline node having greatest connection weight.

4. The method of claim 3 wherein the step of calculating a distance from each baseline node and each prior non-baseline node uses a least common sub-sequence matching algorithm.

5. The method of claim 1 further comprising:

training the neural network using training data, wherein the training data comprises text messages from the preselected source.

6. The method of claim 1 further comprising the steps of preprocessing the received text messages to remove duplicates.

7. The method of claim 1 further comprising the steps of preprocessing the received text messages to break large massages into multiple paragraph-sized units.

8. The method of claim 1 further comprising the steps of preprocessing the received text messages to remove duplicate words, punctuation, and stop words.

9. The method of claim 1 further comprising the step of periodically combining the baseline and non-baseline nodes.

10. The method of claim 9 wherein the step of combining comprises:

encoding token sequences from a selected baseline node with token sequences from a selected non-baseline node in a graph;

randomly traversing the graph a plurality of times;

extracting a child token sequence for each random traversal;

comparing the extracted child token sequence with the selected token sequences; and replacing the selected parent sequences with a best matching child token sequence in response to the comparing step.

11. The method of claim 1 further comprising analyzing atypical received text messages by determining cohesiveness of non-baseline nodes comprising the steps of:

identifying a cluster of non-baseline nodes comprising all non-baseline nodes associated with a selected baseline node;

calculating a distance between each non-baseline node in the identified cluster and each other non-baseline node in the identified cluster such that smaller calculated distances indicate cohesiveness.

12. A method for natural language processing comprising the steps of:

training a neural network comprising a plurality of baseline nodes, wherein a connection weight between any selected pair of baseline nodes is determined from text strings within the selected pair of nodes;

receiving a plurality of text messages from a preselected source;

for each received message, creating a non-baseline node associated with a selected one of the baseline nodes wherein a connection weight between any non-baseline node and the associated baseline node is determined from the text string within the baseline node and the received text message; and identifying atypical received text messages by calculating a distance between each non-baseline node and its associated baseline node such that greater calculated distances indicate atypical data.

13. The method of claim 12 further comprising a step of notifying a user to review the text messages associated with atypical non-baseline nodes in response to the step of identifying atypical nodes.

14. A method for natural language processing comprising the steps of:

training a neural network comprising a plurality of baseline nodes, wherein a connection weight between any selected pair of baseline nodes is determined from text strings within the selected pair of nodes;

receiving a plurality of text messages from a preselected source;

for each received message, creating a non-baseline node associated with a selected one of the baseline nodes wherein a connection weight between any non-baseline node and the associated baseline node is determined from the text string within the baseline node and the received text message; and analyzing atypical received text messages by determining a magnitude of a frequency of associations of non-baseline nodes with a selected baseline node.

15. A computer program product comprising:

a computer usable medium having computer readable code embodied therein for natural language processing, the computer program product comprising:

computer readable program code devices configured to cause a computer to effect a trained neural network comprising a plurality of baseline nodes, wherein each baseline node has a weight that is represented by a text string within the node;

computer readable program code devices configured to cause a computer to effect receiving a plurality of text messages from a preselected source;

computer readable program code devices configured to cause a computer to effect for each received message, creating a non-baseline node having a weight that is represented by the received text message;

computer readable program code devices configured to cause a computer to effect associating each non-baseline node with a selected one of the baseline nodes; and computer readable program code devices configured to cause a computer to effect identifying atypical received text based upon a difference between the non-baseline node associated with the received message and the baseline node to which the non-baseline node is associated.

16. The computer program product of claim 15 wherein the computer readable program code devices configured to cause a computer to effect associating each non-baseline node with a selected one of the baseline nodes further comprises:
- computer readable program code devices configured to cause a computer to effect applying each received text message to the neural network;
- computer readable program code devices configured to cause a computer to effect for each non-baseline node, calculating a distance from each baseline node and each prior non-baseline node in the neural network to determine a connection weight, wherein the program code for calculating a distance uses a least common sub-sequence matching algorithm; and
- computer readable program code devices responsive to the calculating step configured to cause a computer to effect associating the non-baseline node directly with a baseline node having the greatest connection weight unless there exists a prior non-baseline node with greater connection weight than the greatest baseline node in which case the non-baseline node is indirectly associated with the baseline node associated with the prior non-baseline node having greatest connection weight.

17. A computer program product comprising:
- a computer usable medium having computer readable code embodied therein for natural language processing, the computer program product comprising:
- computer readable program code devices configured to cause a computer to effect a trained neural network comprising a plurality of baseline nodes, wherein each baseline node has a weight that is represented by a text string within the node;
- computer readable program code devices configured to cause a computer to effect receiving a plurality of text messages from a preselected source;
- computer readable program code devices configured to cause a computer to effect for each received message, creating a non-baseline node having a weight that is represented by the received text message;
- computer readable program code devices configured to cause a computer to effect associating each non-baseline node with a selected one of the baseline nodes;
- computer readable program code devices configured to cause a computer to effect a self-organizing neural network architecture comprising a one-dimensional circular array of baseline nodes;
- computer readable program code devices configured to cause a computer to effect randomizing the weight within each of the baseline nodes;
- computer readable program code devices configured to cause a computer to effect receiving a baseline text messages from the preselected source;
- computer readable program code devices configured to cause a computer to effect associating the received baseline text message with a closest one of the randomized baseline nodes wherein closeness is measured by a longest common sub-sequence algorithm;
- computer readable program code devices configured to cause a computer to effect combining the received baseline text message with the associated baseline node using a genetic algorithm; and
- computer readable program code devices configured to cause a computer to effect iteratively executing the program code effecting the receiving, the associating, and the combining until the neural network achieves a desired state of training.

18. The computer program product of claim 17 wherein the computer readable program code devices configured to cause a computer to effect least common sub-sequence matching algorithm further comprises computer readable program code devices configured to cause a computer to effect the equation:

$$closeness = \frac{len(LCS)}{[\min(len(s1), len(s2)) + \sqrt{len(s1) - len(s2)}]}$$

wherein len(s1) is the length of the text within the baseline node, len(s2) is the length of the baseline text, and len(LCS) is the length of the longest common sequence between s1 and s2.

19. A system for processing information to identify atypical information content of received digitized text information with respect to prior digitized text information, the system comprising:
- a digital computer;
- communication means for electronically collecting text information into the computer, the text organized in messages;
- software operable in the computer for representing the prior digitized text information in a neural network array, the array comprising a plurality of baseline nodes wherein each baseline node occupies a unique location in a text hyperspace and each baseline node has a weight represented by text tokens within the baseline node wherein the text tokens are determined from the prior digitized text;
- software operable in the computer for representing each received message as a non-baseline node having a position in the text hyperspace;
- software operable in the computer for directly or indirectly associating each non-baseline node with one baseline node; and
- software operable in the computer for evaluating relative positions of the non-baseline nodes in the text hyperspace to identify atypical received messages.

20. The system of claim 19 wherein the software operable in the computer for evaluating relative positions calculates a metric score based upon content of the baseline nodes and the non-baseline nodes.

21. A system for processing information to identify atypical information content of received digitized text information with respect to prior digitized text information, the system comprising:
- a digital computer;
- communication means for electronically collecting text information into the computer, the text organized in messages;
- software operable in the computer for representing the prior digitized text information in a neural network array, the array comprising a plurality of baseline nodes wherein each baseline node occupies a unique location in a text hyperspace and each baseline node has a weight represented by text tokens within the baseline node;
- software operable in the computer for representing each received message as a non-baseline node having a position in the text hyperspace;

software operable in the computer for directly or indirectly associating each non-baseline node with one baseline node; and software operable in the computer for evaluating relative positions of the non-baseline nodes in the text hyperspace to identify atypical received messages, wherein the software operable in the computer for evaluating relative positions calculates a metric score using the equation:

$$\text{score} = \frac{len(LCS)}{\left[\min(len(s1), len(s2)) + \sqrt{len(s1) - len(s2)}\right]}$$

wherein len(s1) is the length of text within the baseline node, len(s2) is the length of text within the non-baseline node, and len(LCS) is the length of the longest common sequence between s1 and s2.

22. A system for processing information to identify atypical information content of received digitized text information with respect to prior digitized text information, the system comprising:

a digital computer;

communication means for electronically collecting text information into the computer, the text organized in messages;

software operable in the computer for representing the prior digitized text information in a neural network array, the array comprising a plurality of baseline nodes wherein each baseline node occupies a unique location in a text hyperspace and each baseline node has a weight represented by text tokens within the baseline node, wherein the software operable in the computer for representing the prior digitized text information in a neural network array further comprises software operable to implement a text domain one dimensional neural network array and the software operable for associating each non-baseline node with one baseline node operates to directly associate each non-baseline node with one of the baseline nodes;

software operable in the computer for representing each received message as a non-baseline node having a position in the text hyperspace;

software operable in the computer for directly or indirectly associating each non-baseline node with one baseline node; and software operable in the computer for evaluating relative positions of the non-baseline nodes in the text hyperspace to identify atypical received messages.

23. A system for processing information to identify atypical information content of received digitized text information with respect to prior digitized text information, the system comprising:

a digital computer;

communication means for electronically collecting text information into the computer, the text organized in messages;

software operable in the computer for representing the prior digitized text information in a neural network array, the array comprising a plurality of baseline nodes wherein each baseline node occupies a unique location in a text hyperspace and each baseline node has a weight represented by text tokens within the baseline node, wherein the software operable in the computer for representing the prior digitized text information in a neural network array further comprises software operable to implement a text domain extensible minimum-spanning-tree (MST) neural network array and the software operable for associating each non-baseline node with one baseline node is operable to associate each non-baseline node with a baseline node or non-baseline node having the smallest relative position;

software operable in the computer for representing each received message as a non-baseline node having a position in the text hyperspace;

software operable in the computer for directly or indirectly associating each non-baseline node with one baseline node; and software operable in the computer for evaluating relative positions of the non-baseline nodes in the text hyperspace to identify atypical received messages.

24. A system for processing information to identify atypical information content of received digitized text information with respect to prior digitized text information, the system comprising:

a digital computer;

communication means for electronically collecting text information into the computer, the text organized in messages;

software operable in the computer for representing the prior digitized text information in a neural network array, the array comprising a plurality of baseline nodes wherein each baseline node occupies a unique location in a text hyperspace and each baseline node has a weight represented by text tokens within the baseline node;

software operable in the computer for representing each received message as a non-baseline node having a position in the text hyperspace;

software operable in the computer for directly or indirectly associating each non-baseline node with one baseline node;

software operable in the computer for evaluating relative positions of the non-baseline nodes in the text hyperspace to identify atypical received messages; and software operable in the computer for combining the contents of a non-baseline node with the contents of a selected baseline node in order to train the neural network.

25. The system of claim 24 wherein the software operable for combining comprises a genetic algorithm.

* * * * *